Jan. 28, 1947.  W. E. AMBERG  2,414,920
PAPER DISH HOLDER
Filed July 17, 1944
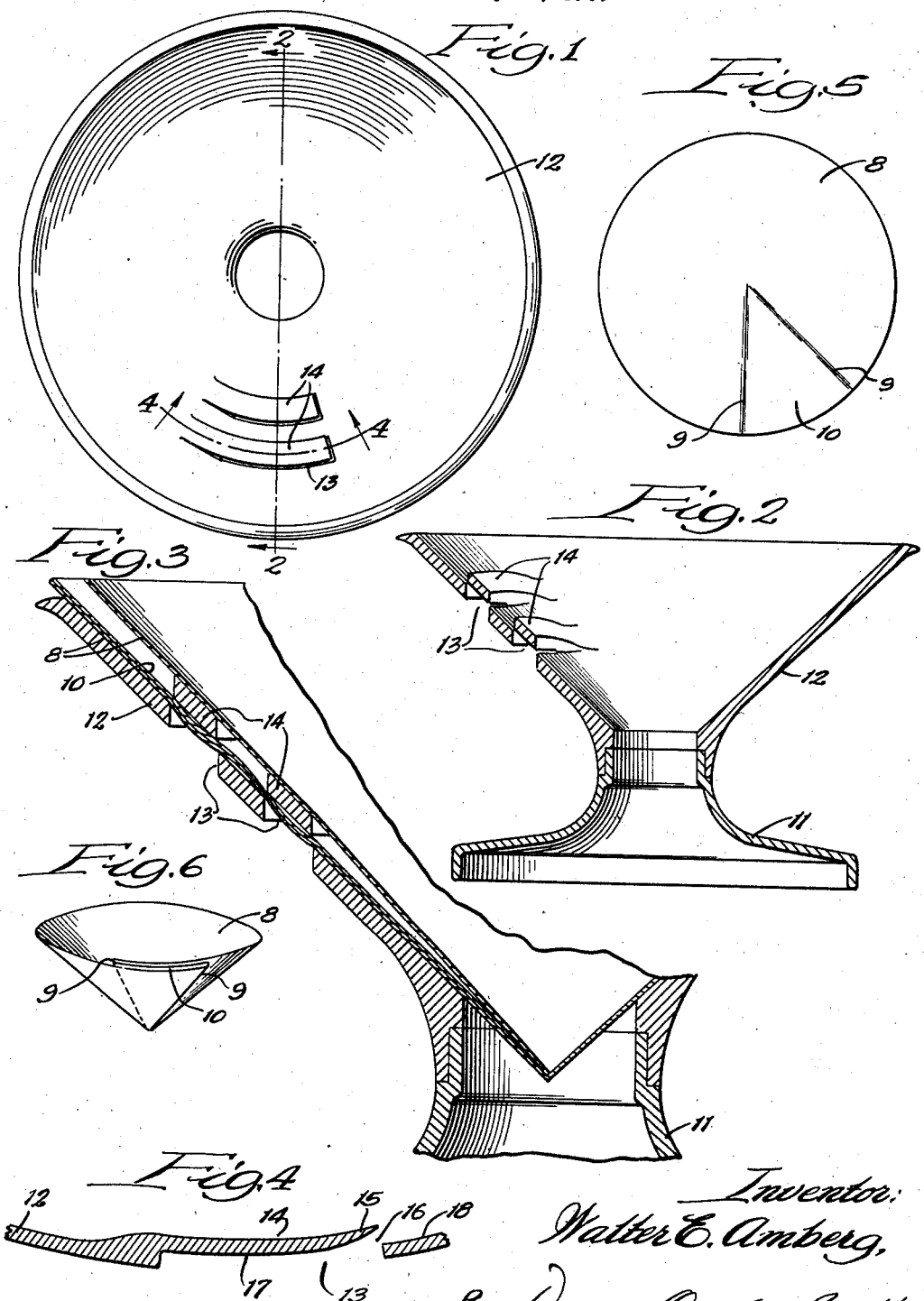
Inventor:
Walter E. Amberg,
By Dawson, Orms and Borth,
Attorneys.

Patented Jan. 28, 1947

2,414,920

UNITED STATES PATENT OFFICE 2,414,920

PAPER DISH HOLDER

Walter E. Amberg, Beverly Shores, Ind., assignor to Universal Paper Products Company, a corporation of Illinois Application July 17, 1944, Serial No. 545,227

2 Claims. (Cl. 65—61)

This invention relates to a holder for paper dishes of the kind customarily used in the serving of ice cream sundaes.

One of the objects of the invention is to provide a simple dish holder which can be easily fabricated from familiar materials and which will positively hold the paper dish within the holder both during the filling of the dish and also during the time when the user is emptying the contents from the dish.

Another object of the invention is to provide a paper dish holder which can be used to pick up a single dish from an inverted stack of dishes and to effect retention of the dish within the holder merely by turning the holder upon the inverted stack of dishes.

These and other features of the invention will be seen from the following detailed specification read in connection with the accompanying drawing forming part thereof and in which—

Fig. 1 is a plan view of the bowl of the paper dish holder of this invention;

Fig. 2 is a vertical section of the dish holder;

Fig. 3 is an enlarged fragmentary section of the dish holder showing in section a dish held therein, taken on the line 2—2 of Fig. 1;

Fig. 4 is an enlarged fragmentary section of the retaining slot and retaining finger, taken on the line 4—4 of Fig. 1;

Fig. 5 is a reduced plan view of a paper dish used in the paper dish holder of this invention; and Fig. 6 is a reduced perspective of a paper dish used in the paper dish holder of this invention.

Referring to the drawing, the paper dish conventionally used in paper dish holders of this type is one formed as shown in Fig. 5. A circular disc of paper is creased along two radial lines 9 and the disc then drawn into a cone which has substantially the same taper as the bowl of the dish holder, as shown in Fig. 6.

When the cup 8 is formed by creasing of the radial lines 9 and the cup shaped into the conical form, the cup is of a single thickness except for an area substantially equal to that shown in Fig. 5 as 10, which will be of trebled thickness. When the cup 8 is so formed a doubled flap 7 of roughly triangular shape is formed on the outside of the cup.

The dish holder of this invention is formed of a base or pedestal 11 and a bowl 12. It may be formed of metal, glass, plastics, wood, or any other suitable material. The wall of the bowl is cut as shown in Figs. 1 and 2 by a plurality of retainer slots 13, which are generally concentric with the upper edge of the bowl and extend for a sufficient distance in the bowl wall to permit the flap of the dish 8 to be retained therein by the retainer fingers 14. These fingers, as best shown in Fig. 4, are formed concentrically with the wall of the holder bowl 12 and are brought to an edge 15 which leaves the gap 16 between the bowl wall 12 and the finger 14 for entry of the flap upon the sundae dish 8.

These fingers may be formed integrally with the bowl wall or may be attached thereto by means of adhesives, rivets, or any other suitable attaching means, depending upon the materials from which the bowl is constructed.

For best performance of the paper dish holder, the outer wall 17 of the retainer fingers 14 should be in substantially the plane of the inner wall 18 of the bowl. The plane of the outer wall 17 of the retainer fingers must not be spaced from the inner wall 18 of the bowl wall 12 by a greater distance than the thickness of two laminations of the paper from which the dish 8 is formed, although obviously portions of the fingers may actually project partly within the slots 13.

Method of operation

The paper dishes 8 which are used in the dish holders of this type are usually stored in inverted stacks because they will stand on their mouths. The inner surface is thus kept clean and free of dust and they can be more readily picked up for use when in that position.

With the paper dish holder of this invention a paper dish may be picked from the inverted stack merely by placing the inverted dish holder upon the stack and turning it in a clockwise direction until the flap formed upon the outer surface of the dish enters the gap 16 and is gripped between the retainer fingers 14 and the walls of the retainer slots 13. Inasmuch as the fingers are spaced from the walls of the bowl a lesser distance than the thickness of the two laminations of paper which enter the gap 16, the flap will be warped, as shown in Fig. 3, and the dish will be thereby gripped in the holder.

When the dish is gripped in the holder the holder may be turned into upright position and filled with the material which it is designed to contain. The material may then be emptied from the dish without dislocating the dish in the holder or without any danger of the dish being stripped from the holder with the possibility of spilling the contents.

When the contents have been removed from the dish and it is desired to remove the dish from the holder, the dish can be held between the fingers and given a slight turn to free it from the retainer fingers 14, whereupon it can be lifted from the cup.

Having thus shown and described one embodiment of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

I claim:

1. A holder, for a conical paper dish having a folded flap, comprising a base, a conical bowl, a plurality of parallel slots arranged concentrically in the wall of the bowl, and a plurality of parallel fingers joined at one end to the wall of the bowl and extending in the same direction to overlie the slots, said fingers extending inwardly at the juncture with the wall of the bowl and then substantially parallel with the inner surface of the bowl with their tips extending inwardly to receive the folded flap of the paper dish.

2. A holder, for a conical paper dish having a folded flap, comprising a base, a conical bowl, a plurality of parallel slots arranged concentrically in the walls of the bowl, and a plurality of parallel fingers joined at one end in the wall of the bowl and extending in the same direction to overlie the slots, said fingers extending inwardly at the juncture with the wall of the bowl and then substantially parallel, and with the plane of the outer edges of the fingers being spaced from the plane of the inner wall of the bowl less than the thickness of the folded flap to warp the folded flap of the paper dish inserted under the fingers.

WALTER E. AMBERG.